US007672995B2

(12) United States Patent
Balasubramanyan et al.

(10) Patent No.: US 7,672,995 B2
(45) Date of Patent: Mar. 2, 2010

(54) SYSTEM AND METHOD FOR PUBLISHING COLLABORATION ITEMS TO A WEB SITE

(75) Inventors: Balaji Balasubramanyan, Redmond, WA (US); William J. Griffin, Sammamish, WA (US); Ryan R. Stocker, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 611 days.

(21) Appl. No.: 11/003,817

(22) Filed: Dec. 2, 2004

(65) Prior Publication Data

US 2006/0123334 A1 Jun. 8, 2006

(51) Int. Cl.
*G06F 15/16* (2006.01)
(52) U.S. Cl. ..................... 709/204; 715/234; 715/239
(58) Field of Classification Search ............... 709/203, 709/204; 715/234, 239
See application file for complete search history.

(56) References Cited

U.S. PATENT DOCUMENTS

| | | | | |
|---|---|---|---|---|
| 6,185,587 | B1* | 2/2001 | Bernardo et al. | 715/513 |
| 6,230,173 | B1* | 5/2001 | Ferrel et al. | 715/205 |
| 6,678,867 | B2* | 1/2004 | Fong et al. | 715/239 |
| 6,684,369 | B1* | 1/2004 | Bernardo et al. | 715/513 |
| 2002/0091725 | A1* | 7/2002 | Skok | 707/501.1 |
| 2002/0152245 | A1* | 10/2002 | McCaskey et al. | 707/530 |
| 2004/0123244 | A1* | 6/2004 | Campbell et al. | 715/517 |
| 2004/0205592 | A1* | 10/2004 | Huang | 715/513 |
| 2004/0205644 | A1* | 10/2004 | Shaughnessy et al. | 715/530 |
| 2005/0021533 | A1* | 1/2005 | Ayachitula et al. | 707/100 |
| 2005/0080804 | A1* | 4/2005 | Bradshaw et al. | 707/102 |
| 2005/0138554 | A1* | 6/2005 | Bell et al. | 715/530 |
| 2005/0160110 | A1* | 7/2005 | Charlet et al. | 707/102 |
| 2006/0070004 | A1* | 3/2006 | Miller et al. | 715/760 |
| 2006/0112123 | A1* | 5/2006 | Clark et al. | 707/101 |
| 2006/0129942 | A1* | 6/2006 | McCary | 715/741 |
| 2006/0136353 | A1* | 6/2006 | Crockett et al. | 707/1 |
| 2006/0143561 | A1* | 6/2006 | Balasubramanyan et al. | 715/513 |
| 2006/0168226 | A1* | 7/2006 | Miller et al. | 709/226 |
| 2006/0212796 | A1* | 9/2006 | Heuer et al. | 715/513 |
| 2007/0028166 | A1* | 2/2007 | Hundhausen et al. | 715/530 |
| 2009/0138808 | A1* | 5/2009 | Moromisato et al. | 715/758 |

FOREIGN PATENT DOCUMENTS

WO WO 03/067469 A2 2/2003

OTHER PUBLICATIONS

Roland Gradl et al.; "Using Microsoft Content Management Server 2002 Connector for SharePoint Technologies"; Jan. 2004; 10 pgs.
Troy Dreier; "Groove and Microsoft Take Office out of Office"; Apr. 24, 2006; 3 pgs.
"Microsoft Content Management Server 2002 Connector for SharePoint Technologies Evaluation Guide"; Mar. 2004; 32 pgs.

* cited by examiner

Primary Examiner—Andrew Caldwell
Assistant Examiner—Oleg Survillo
(74) Attorney, Agent, or Firm—Merchant & Gould, P.C.

(57) ABSTRACT

A computer-implemented process takes content created collaboratively from a workgroup environment and converts it into a scheduled web page that is publishable on the Internet. The computer-implemented process loosely relates the generated collaboration content and the published web page such that each may be independently modified and have independent life cycles, but still reflect changes to the collaboration content on the published web page.

23 Claims, 5 Drawing Sheets

SYSTEM AND METHOD FOR PUBLISHING COLLABORATION ITEMS TO A WEB SITE

BACKGROUND OF THE INVENTION

Content management is an increasing concern for web site developers and other publishers of information to the Internet. As the content management market matures, there is a growing realization that content is seldom created specifically for web publishing. Often there is a wealth of information that is left untapped because the current form of the information does not lend it to publication.

For example, certain types of content are created through collaboration and are initially targeted to a specific work group. This content then grows over time through further collaboration between work group members. This content is generally made for a specific intranet audience composed of the users involved in the collaboration. However, this library of effort and information may eventually be of interest to other groups or the public at large. Accordingly, the content may eventually be pushed to a web site. Pushing the content to the Web site may require substantial effort on the part of the content manager. The content manager would be required to add the appropriate publishing information and possibly rewrite the information into a format that takes advantage of certain publishing functions. A solution is needed that allows the collaboration information to be efficiently published without required so much interaction on the part of the content manager.

SUMMARY OF THE INVENTION

Embodiments of the present invention relate to a system and method for publishing collaboration items to a web site. In accordance with one aspect of the present invention, a method is provided for converting data created according to established collaboration tools to a content type that allows for publishing the data to a Web site. In one example, the content is created using WINDOWS SHAREPOINT SERVICES (WSS) server software created by Microsoft Corporation of Redmond, Wash. WSS is a server software package that provides a rich collaboration environment using different types of lists and document libraries for creating collaboration content. The present invention takes this collaboration content and converts it into a scheduled web page that is publishable on the Internet without placing an undue burden on a content manager for facilitating the conversion. Additionally, the present invention loosely relates the generated collaboration content and the published web page such that each may be independently modified and have independent life cycles, but still reflect changes to the collaboration content on the published web page.

In accordance with one aspect of the present invention, presentation information is associated with a collaboration schema that corresponds to the collaboration information. A publication schema is derived from the collaboration schema. The publication schema includes additional properties for publishing the collaboration information to the network. The publication schema is then used to publish the collaboration information to the network.

In accordance with another aspect of the present invention, presentation information is associated with a collaboration schema that corresponds to collaboration information on a collaboration site. A publication schema is derived from the collaboration schema. The publication schema includes additional properties for publishing the collaboration information to the network. The collaboration information is copied from the collaboration site to a publication page in accordance with the publication schema. The changes to the collaboration information on the collaboration site are reflected automatically in the publication page. Also, the publication page is associated with the collaboration information of the collaboration site such that changes to the collaboration information and the publication page are both reflected on the network.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
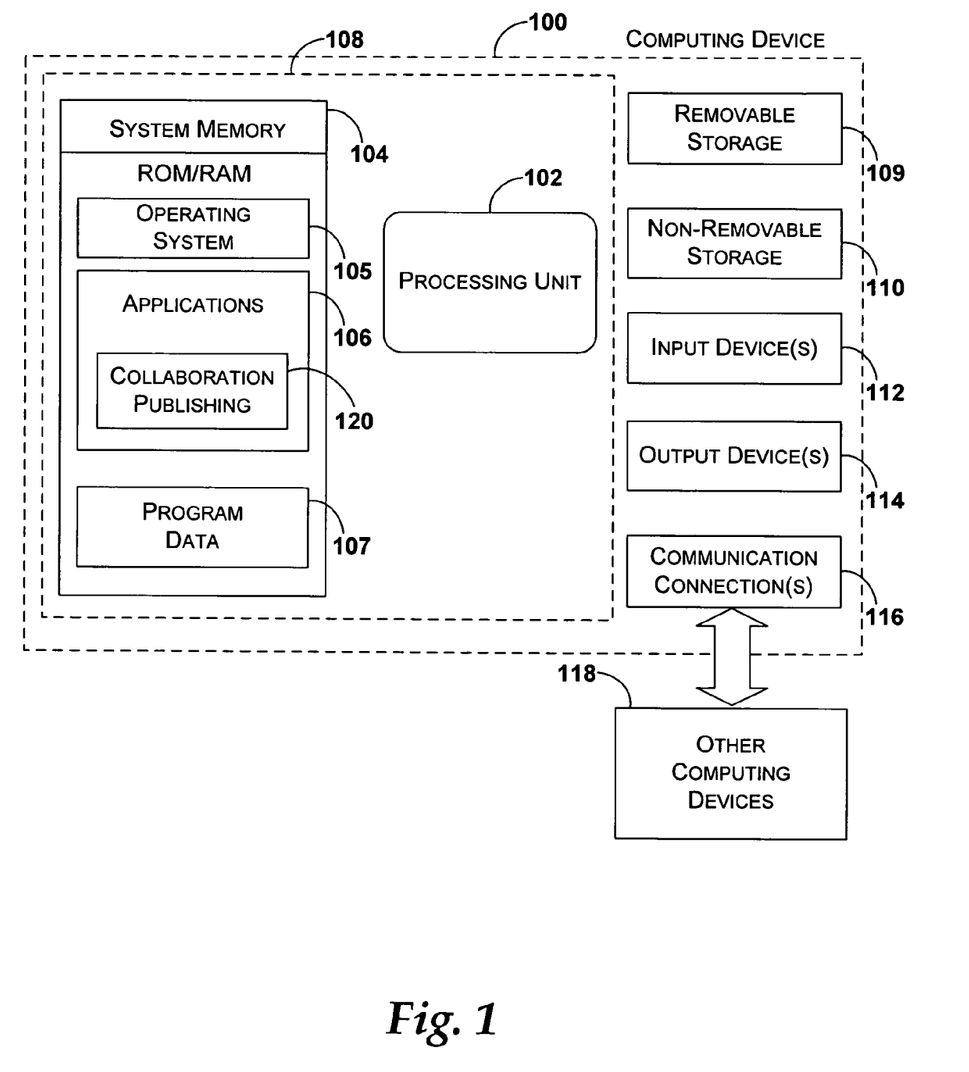
FIG. 1 illustrates an exemplary computing device that may be used in one exemplary embodiment of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. In one embodiment, applications 106 further include a collaboration publishing application 120 for implementing the functionality of the present invention. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Embodiments for Publishing Collaboration Information

Embodiments of the present invention are related to automatically converting collaboratively created content for publishing to the Internet. In one embodiment, the present invention provides a schema extension that provides support for the additional properties needed to publish the collaboration content. After extending the schema, the content from the collaboration effort is copied to a page corresponding to the schema extension. The layouts for rendering the pages are associated with the schema used to create the collaboration content. The layout is then capable of rendering the collaboration content. Also, the collaboration content in both the collaborative environment and the web environment is rendered similarly for a consistent user experience.

Figure 2:
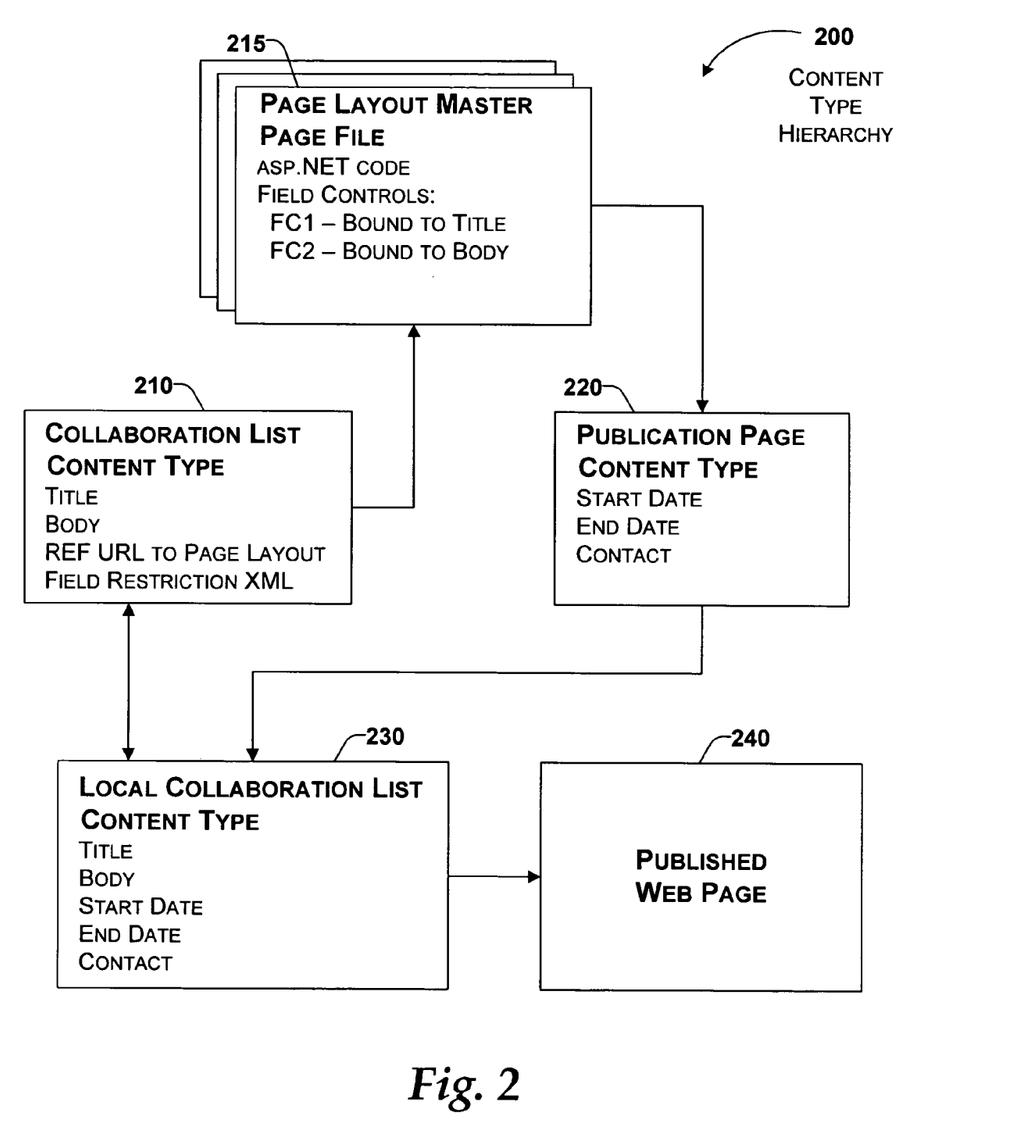
FIG. 2 illustrates an exemplary content type hierarchy for the creation of a local collaboration list content type that may used in publishing collaboration content in accordance with the present invention.

FIG. 2 illustrates an exemplary content type hierarchy for the creation of a local collaboration list content type that may used in publishing collaboration content in accordance with the present invention. System 200 includes collaboration list content type 210, one or more page layout master page files 215, publication page content type 220, local collaboration list content type 230, and published web page 240.

Collaboration list content type 210 is a schema that provides a content type for generating and maintaining collaboration data. Lists are collections of items that may correspond to events, announcements, or other items of information relevant to a collaborative effort. Collaboration list content type 210 describes the format and the type of content in these lists. Each type of list may have its own specific look and feel as defined by its content type. In the example shown, collaboration list content type 210 has profile properties that include a title and body associated with the collaboration content. However, other elements (e.g., author, date, etc.) may also be related with the collaboration list content type 210. In the embodiment shown, collaboration list content type 210 is also augmented to include at least one reference URL (uniform resource locator) to a page layout master page file (e.g., 215) and field restriction XML (extensible markup language). Field restriction XML provides field restriction definitions each of the schema elements. For example, field restriction XML may provide that a collaboration item's title has a specified restriction associated (e.g., number of characters <=X).

In one embodiment, the reference URL is included in page layout XML (extensible markup language) that provides an XML representation of a set of references to one or more master page files. Page layout master page file 215 provides a page layout definition that conforms to a page layout that may be used when publishing a collaboration item. For example, one page layout may direct the title to be at the top and the body to be at the bottom. Another page layout may have the title to the left and the body to the right on the page. Each page layout is associated with one schema, or one content type. However, each content type may have multiple associated page layouts as shown. Page layout master page file 215 may provide a particular layout according to ASP.NET code or another code type. The code provides for field controls (e.g., FC1 and FC2) that describe the content and orientation of fields included in the published web page.

Publication page content type 220 is a specific schema that provides a content type for publishing data to the Internet. In the example shown, publication list content type has profile properties that include a start date, an end date, and a contact. The start date corresponds to the date and time the data should be first published to the Internet. The end date corresponds to the date and time that publication of the data should discontinue. Contact refers to the individual for directing questions about the data being published.

Local collaboration list content type 230 is a content type generated for the present invention that corresponds to both collaboration list content type 210 and publication page content type 220. However, according to current restrictions, a content type may not be "derived" from, or have an inheritance relation with, more than one other content type. Stated differently, a child content type may only have a single parent content type. Accordingly, local collaboration list content type 230 may only be derived from either collaboration list content type 210 or publication page content type 220. In one embodiment, local collaboration list content type 210 is derived from collaboration list content type 230. Accordingly, local collaboration list content type 230 inherits all the profile properties of collaboration list content type 210. In contrast, the profile properties of publication page content type 220 are copied into local collaboration list content type 230. Changes to a profile property (e.g., start date) in publication page content type 220 are not propagated into local collaboration list content type 230. However, changes to a profile property (e.g., title) in collaboration list content type 210 are propagated into local collaboration list content type 230 due to their inheritance relationship. A process for generating local collaboration list content type 230 is described more fully in the discussion of FIG. 3 below.

Generally, collaboration items are associated with collaboration content type 210. However, when a collaboration item is included in a publication list, the items are associated with local collaboration list content type 230. Associating the collaboration item with local collaboration list content type 230 allows the functionality for publishing to be added to the content type of the collaboration item. In another embodiment, a published collaboration item remains associated with collaboration list content type 210 while the additional properties from publication page content type 220 are added to the published collaboration item through local collaboration list content type 230.

Published web page 240 is the rendered version of the collaboration content as defined by local collaboration list content type 230. Once rendered, changes may occur to collaboration list content type 210 or local collaboration list content type 230 that may be reflected in published web page 240 automatically. Processing collaboration items for publishing to a web page is described more fully in the discussion of FIGS. 4 and 5 below.

Figure 3:
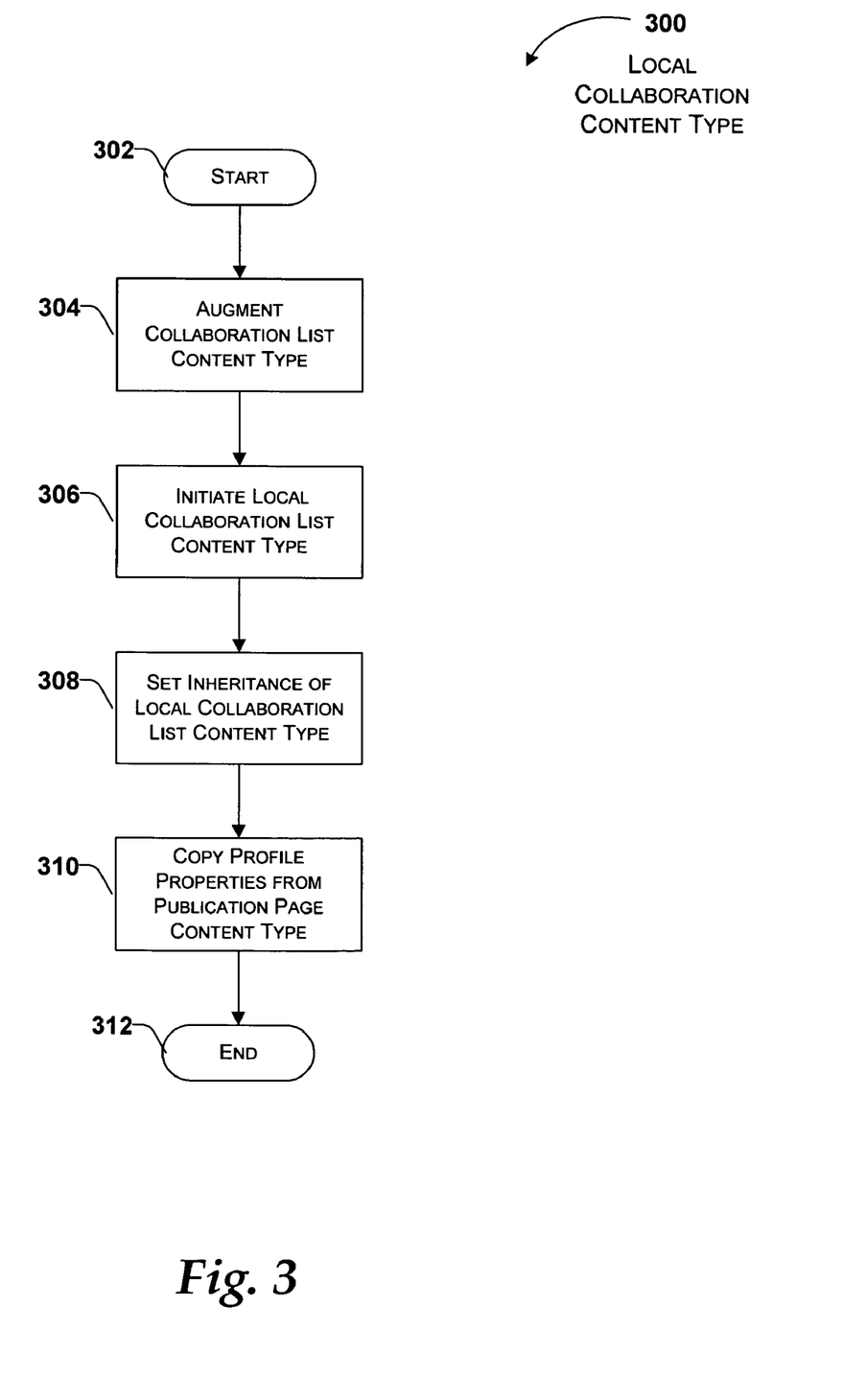
FIG. 3 illustrates a logical flow diagram of an exemplary process for generating a local collaboration list content type in accordance with the present invention.

FIG. 3 illustrates a logical flow diagram of an exemplary process for generating a local collaboration list content type in accordance with the present invention. Process 300 starts at block 302 where a collaboration item has been generated according to a collaboration list content type and a content manager or other user selects to publish the collaboration item to a web site. Processing continues at block 304.

At block 304, the collaboration list content type is augmented to include the reference to at least one page layout master page file and the field restriction XML. Including the page layout reference and the field restriction XML allows the collaboration list content type to correspond to a format that may be published on a web site. Accordingly, collaboration items created with the augmented collaboration list content type conform to a format for publishing. Once the collaboration list content type is augmented, processing proceeds to block 306.

At block 306, the local collaboration list content type is initiated as a new content type for publishing the collaborative content. Processing continues at block 308.

At block 308, the inheritance of the local collaboration list content type is set to correspond to the collaboration list content type. The inheritance ensures that changes occurring to the collaboration list content type are reflected in the local collaboration list content type. For example, a change may occur to the format of the title field in the collaboration list content type. The change in the format of the title field is reflected in the collaboration list content type due to the inheritance. Once the inheritance is set, processing continues at block 310.

At block 310, the profile properties from a publication page content type are copied to the local collaboration list content type. Copying the profile properties from the publication page content type adds the functionality to the local collaboration list content type for publishing the content. The added profile properties allow start and end time to be set as well as other publishing functions to be implemented for the collaboration content. After the profile properties are copied, the local collaboration list content type is generated, and processing advances to block 312 where process 300 ends.

Figure 4:
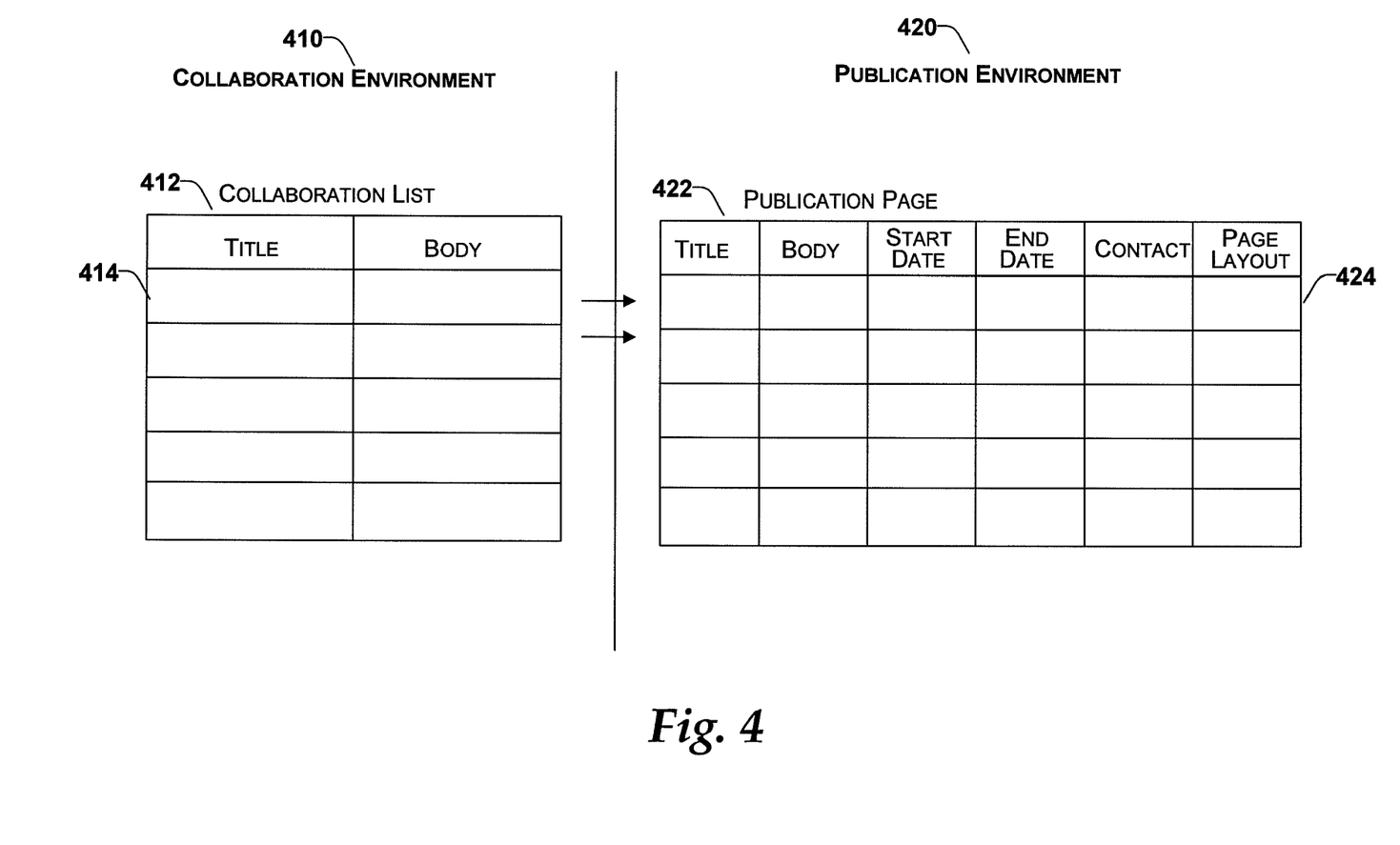
FIG. 4 illustrates an exemplary block diagram for copying a collaboration list of collaboration items to a publication page in accordance with the present invention.

FIG. 4 illustrates an exemplary block diagram for copying a collaboration list of collaboration items to a publication page in accordance with the present invention. After generating the local collaboration list content type, the collaboration items are copied from a collaboration environment (e.g., workgroup environment) 410 to a publication environment 420.

In one embodiment, a set of collaboration items (e.g., 414) are represented as rows within a collaboration list (e.g., 412). Collaboration list 412 corresponds to a particular content type (e.g., announcements, events, etc.). A copy method (e.g., autocopy) is used to copy collaboration items 414 to publication page 424 so that a relationship is maintained between the collaboration items (e.g., 414) of collaboration list 412 and the publication items (e.g., 424) of publication list (e.g., 422). The items in collaboration list 412 are considered the primary copies, with the items in publication list 422 being the secondary copies. The relationship ensures that whenever the primary copy is changed, those changes are propagated to the secondary copy. In one embodiment, whenever a change occurs to content that alters the secondary copy in publication page 422, a workflow is kicked off that initiates a publication process of the content. Basically, a user or content manager is prompted through a user interface to fill in the remaining fields (e.g., start date, end date, contact, page layout, etc.) of publication page 424. For filling out the page layout field, the user is given the options according the page layouts (e.g., short version, long version) associated with the collaboration list content type (see 210 of FIG. 2). The user interface is able to determine the available page layouts since an inheritance relationship has been maintained between the local collaboration list content type (see 230 of FIG. 2) associated with publication page 422 and the collaboration list content type associated with the original content. Once the collaboration content is published to a web page, a user may view a rendered version of the published content on the web page (see FIG. 5).

Figure 5:
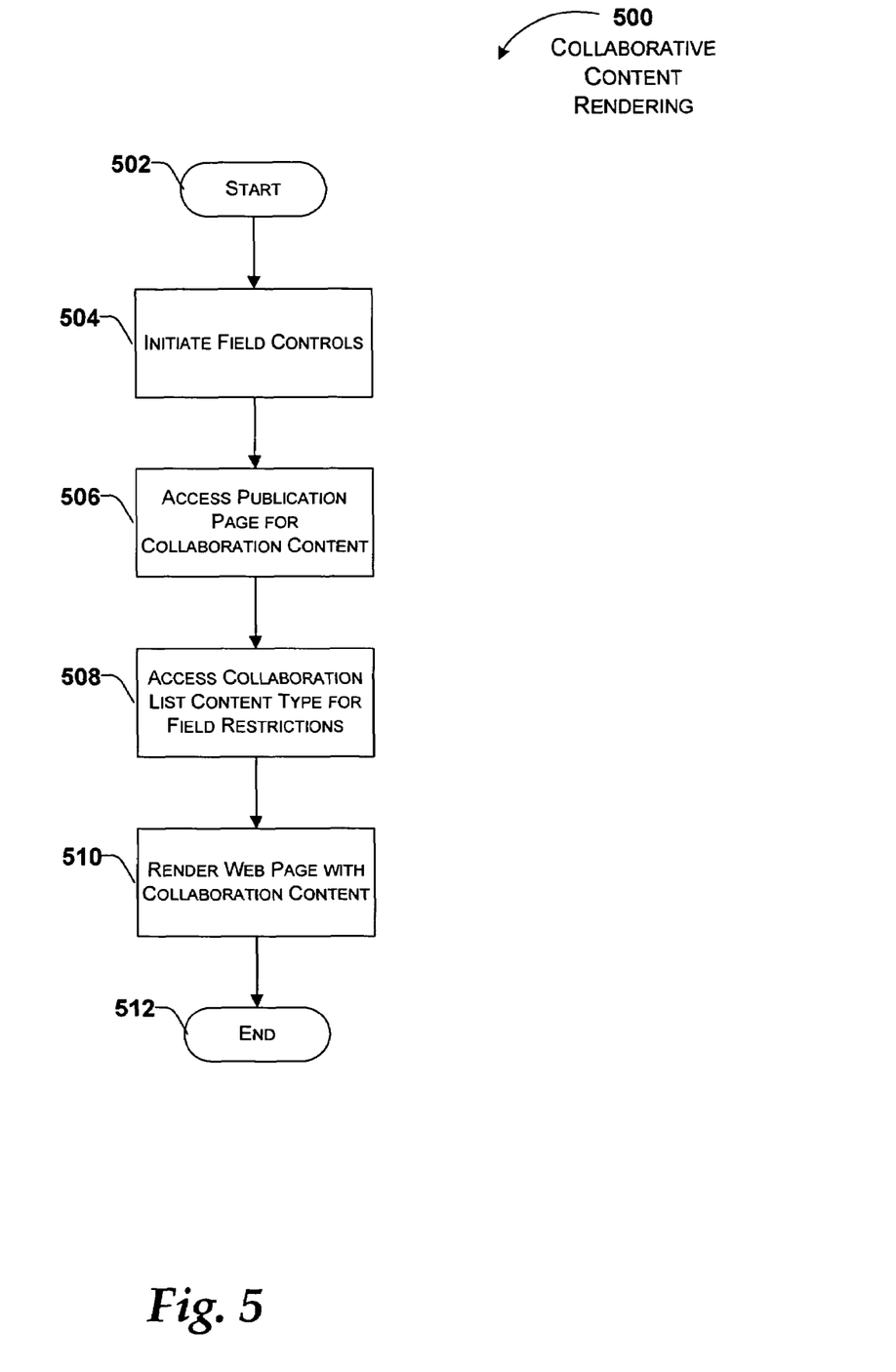
FIG. 5 illustrates a logical flow diagram of an exemplary process for rendering collaborative content on a web page in accordance with the present invention.

FIG. 5 illustrates a logical flow diagram of an exemplary process for rendering collaborative content on a web page in accordance with the present invention. Process 500 starts at block 502 where a user has selected to view the web page containing the collaboration content. Processing continues at block 504.

At block 504, field controls of the web page are initiated for rendering the fields (e.g., title, body) of a collaboration item. In one embodiment, the field controls correspond to ASP-.NET controls. The controls manage the rendering of the collaborative content fields for the web page. Once the field controls are initiated, processing proceeds to block 506.

At block 506, each field control of the web page accesses the publication page to determine the content to be published when rendering the web page. Also, the page layout for the field controls is also determined from the publication page. Once the content and page layout are determined, processing continues at block 508.

At block 508, each field control also accesses the collaboration list content type to obtain any field restrictions. The field controls use the field restrictions to define aspects and limitations for each of the fields. For example, a title field may have a restriction that the text be a certain font size. Processing continues at block 510.

At block 510, the content, the page layout, and the field restrictions are used in rendering the collaborative content fields for viewing by a user. Once the web page has been rendered, the local collaboration list content type is generated, and processing advances to block 512 where process 500 ends.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for publishing collaboration information to a network, comprising:

associating presentation information with a collaboration schema that corresponds to the collaboration information, wherein the collaboration schema describes formatting associated with the presentation information;

deriving a first publication schema from the collaboration schema, wherein the first publication schema is in an inheritance relationship with the collaboration schema, such that changes to the collaboration schema are automatically reflected in the first publication schema;

creating a second publication schema, the second publication schema comprising additional properties;

copying the additional properties from the second publication schema into the first publication schema; and publishing the collaboration information to the network according to the first publication schema.

2. The computer-implemented method of claim 1, further comprising copying the collaboration information from a collaboration site to a publication page in accordance with the first publication schema, wherein the changes to the collaboration information on the collaboration site are reflected automatically in the information published to the network.

3. The computer-implemented method of claim 2, further comprising associating the publication page with the collaboration information of the collaboration site such that changes to the collaboration information and the publication page are both reflected on the network.

4. The computer-implemented method of claim 1, wherein the presentation information further comprises a reference to a page layout definition such that collaboration information generated according to the collaboration schema conforms with the page layout definition.

5. The computer-implemented method of claim 1, wherein the presentation information further comprises a field restriction definition that is used to apply restrictions when publishing the collaboration information to the network.

6. The computer-implemented method of claim 1, wherein copying the additional properties from the second publication schema comprises copying the additional properties without establishing an inheritance relationship between the first publication schema and the second publication schema.

7. The computer-implemented method of claim 1, wherein the collaboration schema and the first publication schema correspond to content type definitions.

8. The computer-implemented method of claim 1, wherein publishing the collaboration information further comprises initiating field controls that are configured to render fields associated with the collaboration information.

9. The computer-implemented method of claim 8, wherein the field controls access a publication page associated with the first publication schema for determining content and layout for publishing the collaboration information.

10. The computer-implemented method of claim 8, wherein the field controls access the collaboration schema for determining field restrictions associated with rendering the fields associated with the collaboration information.

11. A computer-readable storage medium that includes computer-executable instructions for publishing collaboration information to a network, the computer-executable instructions comprising instructions for:

associating presentation information with a collaboration schema that corresponds to collaboration information on a collaboration site, wherein the collaboration schema describes formatting associated with the presentation information;

deriving a first publication schema from the collaboration schema, wherein the first publication schema inherits from the collaboration schema, such that changes to the collaboration schema are automatically reflected in the first publication schema;

creating a second publication schema, the second publication schema comprising additional properties;

copying the additional properties from the second publication schema into the first publication schema; and using the first publication schema to publish the collaboration information to the network, wherein the published collaboration information and the collaboration information of the collaboration site are associated such that changes to the collaboration information of the collaboration are reflected in the published collaboration information.

12. The computer-readable storage medium of claim 11, further comprising instructions for copying the collaboration information from the collaboration site to a publication page in accordance with the first publication schema, wherein the changes to the collaboration information on the collaboration site are reflected automatically in the information published to the network.

13. The computer-readable storage medium of claim 12, further comprising instructions for associating the publication page with the collaboration information of the collaboration site such that changes to the collaboration information and the publication page are both reflected on the network.

14. The computer-readable storage medium of claim 11, wherein the presentation information further comprises a reference to a page layout definition such that collaboration information generated according to the collaboration schema conforms with the page layout definition.

15. The computer-readable storage medium of claim 11, wherein copying the additional properties from the second publication schema comprises copying the additional properties without establishing an inheritance relationship between the first publication schema and the the second publication schema.

16. The computer-readable storage medium of claim 11, wherein publishing the collaboration information further comprises initiating field controls that are configured to render fields associated with the collaboration information.

17. The computer-readable storage medium of claim 16, wherein the field controls access a publication page associated with the first publication schema for determining content and layout for publishing the collaboration information.

18. The computer-readable storage medium of claim 16, wherein the field controls access the collaboration schema for determining field restrictions associated with rendering the fields associated with the collaboration information.

19. A system for publishing collaboration information to a network, comprising:

a computing device; and a set of computer-executable instructions located in memory on the computing device, the computer-executable instructions comprising instructions for:

associating presentation information with a collaboration schema that corresponds to collaboration information on a collaboration site, wherein the collaboration schema describes formatting associated with the presentation information;

deriving a first publication schema from the collaboration schema, wherein the first publication schema inherits from the collaboration schema, such that changes to the collaboration schema are automatically reflected in the first publication schema;

creating a second publication schema, the second publication schema comprising additional properties;

copying the additional properties from the second publication schema into the first publication schema;

copying the collaboration information from the collaboration site to a publication page in accordance with the first publication schema, wherein the changes to the collaboration information on the collaboration site are reflected automatically in the collaboration information copied to the network; and associating the publication page with the collaboration information of the collaboration site such that changes to the collaboration information and the publication page are both reflected on the network.

20. The system of claim 19, wherein the presentation information further comprises a reference to a page layout definition such that collaboration information generated according to the collaboration schema conforms with the page layout definition.

21. The system of claim 20, wherein publishing the collaboration information further comprises initiating field controls that are configured to render fields associated with the collaboration information.

22. The system of claim 21, wherein the field controls access a publication page associated with the first publication schema for determining content and layout for publishing the collaboration information.

23. The system of claim 21, wherein the field controls access the collaboration schema for determining field restrictions associated with rendering the fields associated with the collaboration information.

* * * * *